Jan. 24, 1950 L. DORBEC 2,495,317
HARMONICS GENERATOR
Filed May 21, 1946
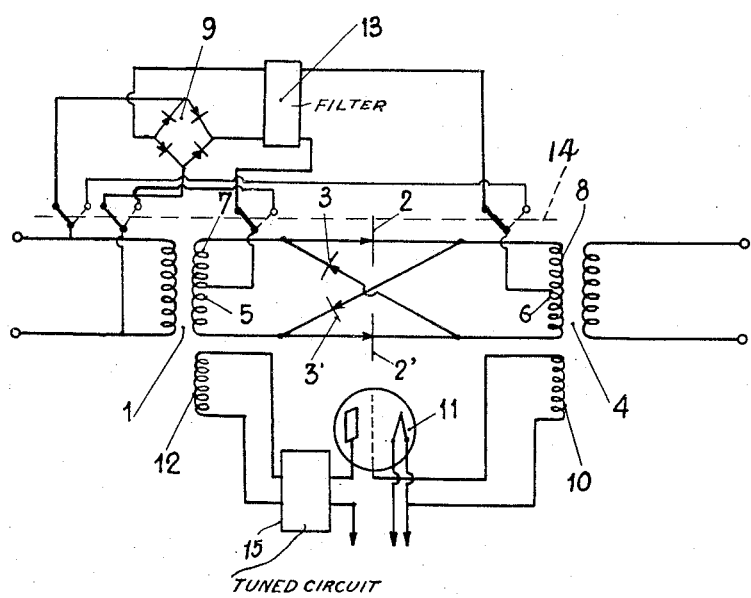
Inventor
L. Dorbec Patented Jan. 24, 1950

2,495,317

UNITED STATES PATENT OFFICE 2,495,317

HARMONICS GENERATOR

Lucien Dorbec, Paris, France, assignor to Societe Anonyme de Telecommunications, Paris, France, a body corporate of France Application May 21, 1946, Serial No. 671,187
In France August 6, 1942

Section 1, Public Law 690, August 8, 1946
Patent expires August 6, 1962

4 Claims. (Cl. 250—36)

The present invention relates to a harmonics generator or to a frequency multiplier. This harmonics generator has for its object to enable the complete series of successive harmonics or odd harmonics only to be produced at will, and it is characterised by the fact that it comprises a modulator supplied, on the one hand, with the fundamental frequency and, on the other hand, with a frequency equal to or double the latter, according as it is desired to produce the complete series of successive harmonics or odd harmonics only and means for returning to the input circuit of said modulator part of the product of modulation.

A form of embodiment of the harmonics generator according to the invention is hereinafter described and illustrated in the accompanying drawing, by way of example.

The fundamental frequency of which it is desired to produce harmonics, supplies the transformer 1, the secondary of which is connected to the apices of one of the diagonals of a circuit in the form of a balanced bridge the four arms of which each contain a rectifier 2, 2', 3, 3' for example a metal-oxide rectifier. The other diagonal has its apices connected to the primary of the transformer 4 in the secondary of which the required harmonics are collected. It is known that $f$ being the frequency of the current supplying the input transformer 1, if a source of frequency $F$ is connected to the mid points 5 and 6 of the windings 7, 8 of the two transformers which are connected to the bridge 2, 2', 3, 3', the double symmetry of the circuit thus produced results in the beat frequencies, $F-f$ and $F+f$ alone appearing in the output circuit, to the exclusion of the frequencies $F$ and $f$. If then, by means of a reaction circuit, part of the products of the modulation received in the output transformer 4 is returned into the primary of the input transformer 1, it will readily be seen that:

1. If $F=f$, the frequencies $f$, $2f$, $3f$ ... $nf$, that is, the complete series of successive harmonics will be obtained, by successive beats in the modulator.

2. If $F=2f$, the series of odd harmonics $f$, $3f$, $5f$ ... $(2n+1)f$ will be obtained under the same conditions.

The circuit according to the invention applies the method explained above and it consists, on the one hand, in connecting the circuit supplying the transformer 1 with the fundamental frequency to the midpoints 5, 6 of the windings 7, 8 of both transformers connected to the balanced bridge 2, 2', 3, 3' through the medium of a frequency doubling device 9 also constituted, for example, by a rectifier circuit arranged in the form of a bridge and, if necessary, through the medium of a filter 13, the frequency doubling device being used at will or put out of circuit, by means of a switch, 14, according as it is desired to obtain odd harmonics or the complete series of the successive harmonics in the output transformer 4, the points 5, 6 being, in this latter case, directly connected to the primary of the transformer 1. On the other hand, the primary of the transformer 4 is coupled, for example by induction, to the secondary of the transformer 1 in order to return to the latter part of the current modulated in 2, 2', 3, 3'. To this end, an inductive winding 10, which is arranged in the proximity of the primary of the transformer 4, is connected, for example through the medium of an amplifying vacuum tube 11, to an inductive winding 12 arranged in the proximity of the input transformer 1.

Under these conditions, the harmonic waves produced in the modulator due to the beat of the two oscillations applied to said modulator in parallel connection and in push-pull connection respectively, are in their turn applied through the feed back circuit in push-pull connection to the modulator in the same manner as the fundamental oscillation, giving rise to the production of a higher harmonic through the beat of the first named harmonic with the oscillation applied in parallel connection to the modulator and so on. According as the frequency applied in parallel connection to the modulator, i. e. at points 5 and 6, is equal or double of the fundamental frequency, a complete series of successive or odd harmonics will be thus obtained.

If the fundamental frequency is equal to 4,000 cycles per second, a frequency of 8,000 is introduced into the modulator through points 5, 6, by making use of the frequency doubling device 9 and at the output end, frequencies of 12,000 and 4,000 will be obtained in the first place. After having passed these frequencies through the winding 7, by means of the reaction circuit 10, 11, 12, they give rise, by beats with the frequency 8,000, to a new frequency 20,000 which in its turn, after having reacted on the input circuit, produces a frequency 28,000, and so on for all the series of odd harmonics. On the contrary, by suppressing the frequency doubling device and by sending the frequency 4,000 both into the primary of the transformer 1 and to the points 5, 6, all the successive harmonics are obtained.

In addition to its simplicity, the device in accordance with the invention offers the advantage of enabling one of the harmonic frequencies to be produced by arranging a circuit 15 tuned to the said frequency in the reaction circuit 10—11—12.

What I claim is:

1. Harmonics generator for obtaining at will odd harmonics and the complete series of successive harmonics of a fundamental frequency, comprising a symmetric modulator, means for supplying said modulator in push-pull connection with the fundamental frequency, means for supplying said modulator in parallel connection with the fundamental frequency, a frequency doubling device inserted in said last named connection for doubling the fundamental frequency supplied in parallel connection to the modulator, means for by-passing said frequency doubling device and a positive feed back circuit connecting the output of the modulator to its input.

2. Harmonics generator enabling the odd harmonics and the complete series of successive harmonics of a fundamental frequency to be obtained, comprising a modulator constituted by a balanced bridge circuit, the four branches whereof each contain a rectifier, a source of fundamental frequency, an input transformer the primary of which is connected to said source whereas the secondary is connected to the apices of one of the bridge diagonals, an output transformer the primary of which is connected to the apices of the second bridge diagonal, whilst the mid-points of the secondary of the input transformer and of the primary of the output transformer are connected to the source of fundamental frequency, a frequency doubling device inserted between the source of fundamental frequency and the mid-points of the secondary winding of the input transformer, and of the primary winding of the output transformer, means for by-passing said frequency doubling device and a positive feed-back circuit for coupling the primary of the output transformer to the secondary of the input transformer.

3. Harmonics generator according to claim 2 wherein the positive feed-back circuit comprises a winding coupled by induction with the primary of the output transformer, a second winding coupled by induction with the secondary of the input transformer and an amplifying tube connecting the said windings.

4. Harmonics generator according to claim 2 wherein the coupling between the output and the input of the modulator comprises a circuit tuned to the frequency of a harmonic oscillation the production of which is particularly desired.

LUCIEN DORBEC.

REFERENCES CITED

The following references are of record in the file of this patent:

UNITED STATES PATENTS

| Number | Name | Date |
|---|---|---|
| 1,678,199 | Rettenmeyer | July 24, 1928 |
| 2,324,815 | Black | July 20, 1943 |

FOREIGN PATENTS

| Number | Country | Date |
|---|---|---|
| 832,078 | France | Sept. 20, 1938 |